Patented June 24, 1930

1,766,057

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing. Application filed January 21, 1929. Serial No. 334,100.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

We have discovered that wood sulfite liquors in dilute, concentrated or anhydrous form and in either an acid, neutral or alkaline state, are capable of being used successfully as treating agents or demulsifying agents in the resolution of petroleum emulsions of the water-in-oil type. Accordingly, we have devised a process for "breaking" such emulsions that contemplates subjecting the emulsion to the action of a treating agent or demulsifying agent that consists of wood sulfite liquor, as hereinafter defined, thereby causing the emulsion to break down and separate into its component parts of oil and water or brine when the emulsion is permitted to remain in a quiescent state after treatment. Such a process is efficient, it is inexpensive to practise and it is distinguished from prior chemical processes for breaking petroleum emulsions of the water-in-oil type, in that it employs as a treating agent or demulsifying agent a substance or material not heretofore used for that purpose.

In addition to being an efficient demulsifying agent for petroleum emulsions, the wood sulfite liquor contemplated by our process is easy to obtain and it can be produced or obtained at a relatively low cost. One available source of supply for such substances or materials is the liquor that is obtained as a waste product in the manufacture of paper stock by the sulfite process, which sulfite process, as is well known, consists of cooking wood chips under pressure in a digestor with bisulfite liquor or bisulfite acid which is obtained by oxidation of sulfur and subsequent reaction with milk of lime prepared from a limestone, preferably calcium-magnesium limestone. The said cooking operation produces a mixture of wood pulp and wood sulfite liquor, and subsequently, said mixture is subjected to treatment so as to separate and recover the wood pulp from the wood sulfite liquor. Wood sulfite liquor or liquor extract, suitable for use as the treating agent or demulsifying agent of our process, can also be produced or obtained as the direct product or principal product of a process consisting of cooking inferior woods not suitable or practicable for use in the manufacture of paper stock, with bisulfite liquor or bisulfite acid of the kind mentioned, and then recovering the wood sulfite liquor from the unsuitable wood pulp which constitutes the waste product of the process, the cooking operation being carried on under pressure in a digestor or other suitable apparatus. Concentrated wood sulfite liquor or extract of the kind above referred to is of approximately the following composition:

| | |
|---|---|
| Specific gravity | 30. 2° Baumé |
| Ash | 6. 59% |
| Iron | . 034% |
| Lime (CaO) | 1. 32% |
| Magnesia (MgO) | 1. 54% |
| Solids | 51. 03% |
| Soluble solids | 51. 03% |
| Non-tannin | 28. 80% |
| Tannin | 22. 23% |
| Tannin purity | 43. 54% |

The form, state or condition of the wood sulfite liquor at the time it is used to constitute the demulsifying agent of our process may be varied to suit existing conditions. It can be used in its natural state, as it comes from the digestor, i. e., in a more or less dilute acid state, but we prefer to neutralize it prior to admixture with the emulsion that is to be demulsified, so that the oil recovered from the emulsion will not have a destructive corroding action on the pipe lines, tank cars or storage tanks in which said oil is confined. One simple and efficient procedure that may be used to neutralize the wood sulfite liquor consists in treating the same with caustic soda, caustic potash, ammonium hydroxide, magnesium oxide, calcium oxide, or other suitable hydrates or carbonates. Ordinarily, wood sulfite liquor, which is acid in nature, is neutralized with or combined with the cheapest basic substance, i. e., calcium or magnesium oxide, but as we have previously stated, it is just as suitable to employ other more expensive bases, such as soda, or potash, or ammonia. We have herein used the term "wood sulfite liquor" to indicate the material as produced from the conventional bases, i. e., calcium oxide, or magnesium oxide, as well as from soda, potash and ammonia. In order to reduce the expense of transporting the wood sulfite liquor to the place where it is to be used as a treating agent or demulsifying agent for petroleum emulsions, said liquor may, if desired, be concentrated before shipment, so as to increase the specific gravity of same to approximately 30 to 32° Baumé or even to a solid state. As herein used, the term "wood sulfite liquor" is intended to mean essentially the solid active material and not the inactive water, which is a diluent or vehicle only, it being our intention to include in the above quoted term the concentrated liquor, or even the anhydrous solid.

Our broad idea contemplates using wood sulfite liquor in any condition or state, for the purpose of breaking a petroleum emulsion. It may be added directly to the emulsion in the form of a water solution; in the form of a dry powder; in the form of a powder suspended in oil; or in the form of a concentrated solution emulsified with oil by the presence of an emulsifying agent such as calcium oleate. If desired, other substances known to have demulsifying properties for petroleum emulsions of the water-in-oil type, such, for example, as water softeners, modified fatty acids, etc., may be mixed with the wood sulfite liquor or extract that is used as the demulsifying agent of our process.

In practising our process we prefer to use wood sulfite liquor containing the water soluble alkaline earth salts, preferably, the calcium salts. The treating agent may be brought in contact with the emulsion to be treated in any of the numerous ways now employed in the treatment of petroleum emulsions of the water-in-oil type with chemical demulsifying agents, such, for example, as by introducing said agent into the well in which the emulsion is produced; introducing said agent into a conduit through which the emulsion is flowing; introducing said agent into a tank in which the emulsion is stored; or introducing said agent into a container that holds a sludge obtained from the bottom of the oil storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground.

After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing wood sulfite liquor.

2. A process for breaking a petroleum emulsion of the water-in-oil type, which consists in subjecting the emulsion to the action of a demulsifying agent containing wood sulfite liquor in which the metallic base is derived from an alkali-forming metal.

3. A process for breaking a petroleum emulsion of the water-in-oil type, which consists in subjecting the emulsion to the action of a demulsifying agent containing wood sulfite liquor obtained by neutralization with a basic calcium compound.

MELVIN DE GROOTE.
LOUIS. T. MONSON,